(12) United States Patent
Gopinath et al.

(10) Patent No.: US 7,386,454 B2
(45) Date of Patent: Jun. 10, 2008

(54) NATURAL ERROR HANDLING IN SPEECH RECOGNITION

(75) Inventors: Ramesh A. Gopinath, Millwood, NY (US); Benoit Maison, White Plains, NY (US); Brian C. Wu, Cos Cob, CT (US)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 10/210,704

(22) Filed: Jul. 31, 2002

(65) Prior Publication Data
US 2004/0024601 A1 Feb. 5, 2004

(51) Int. Cl.
*G10L 11/00* (2006.01)
*G10L 21/00* (2006.01)

(52) U.S. Cl. .................. 704/270; 704/251; 704/257; 704/9

(58) Field of Classification Search ........... 704/270, 704/9
See application file for complete search history.

(56) References Cited

U.S. PATENT DOCUMENTS

| | | | | |
|---|---|---|---|---|
| 5,712,957 A | * | 1/1998 | Waibel et al. | 704/240 |
| 5,799,273 A | * | 8/1998 | Mitchell et al. | 704/235 |
| 5,842,163 A | * | 11/1998 | Weintraub | 704/240 |
| 5,855,000 A | * | 12/1998 | Waibel et al. | 704/235 |
| 5,909,667 A | * | 6/1999 | Leontiades et al. | 704/275 |
| 5,960,447 A | * | 9/1999 | Holt et al. | 715/500 |
| 6,044,347 A | * | 3/2000 | Abella et al. | 704/272 |
| 6,321,196 B1 | * | 11/2001 | Franceschi | 704/243 |
| 6,327,566 B1 | * | 12/2001 | Vanbuskirk et al. | 704/257 |
| 6,347,296 B1 | * | 2/2002 | Friedland | 704/231 |
| 6,418,410 B1 | * | 7/2002 | Nassiff et al. | 704/251 |
| 6,513,005 B1 | * | 1/2003 | Su et al. | 704/254 |
| 6,912,498 B2 | * | 6/2005 | Stevens et al. | 704/235 |
| 6,922,669 B2 | * | 7/2005 | Schalk et al. | 704/255 |
| 2002/0133340 A1 | | 9/2002 | Basson et al. | |
| 2003/0083876 A1 | * | 5/2003 | Lin | 704/251 |
| 2003/0110035 A1 | * | 6/2003 | Thong et al. | 704/254 |
| 2003/0189603 A1 | * | 10/2003 | Goyal et al. | 345/863 |
| 2003/0233230 A1 | * | 12/2003 | Ammicht et al. | 704/235 |
| 2004/0085162 A1 | * | 5/2004 | Agarwal et al. | 333/196 |
| 2005/0033574 A1 | * | 2/2005 | Kim et al. | 704/251 |
| 2005/0149319 A1 | * | 7/2005 | Honda et al. | 704/9 |

OTHER PUBLICATIONS

J.G. Fiscus, A Post-Processing System to Yield Reduced Word Error Rates: Recognizer Output Voting Error Reduction (ROVER), IEEE Automatic Speech Recognition and Understanding Workshop, 1997, 347-352,Santa Barbara, CA.

* cited by examiner

*Primary Examiner*—David Hudspeth
*Assistant Examiner*—Eunice Ng
(74) *Attorney, Agent, or Firm*—Ference & Associates LLC

(57) ABSTRACT

A user interface, and associated techniques, that permit a fast and efficient way of correcting speech recognition errors, or of diminishing their impact. The user may correct mistakes in a natural way, essentially by repeating the information that was incorrectly recognized previously. Such a mechanism closely approximates what human-to-human dialogue would be in similar circumstances. Such a system fully takes advantage of all the information provided by the user, and on its own estimates the quality of the recognition in order to determine the correct sequence of words in the fewest number of steps.

10 Claims, 4 Drawing Sheets

EXAMPLES OF SYSTEM CONFIGURATION:
  A. STAND ALONE (DESKTOP) COMPUTER
  B. NETWORKED (DESKTOP) (WIRED/WIRELESS) COMPUTER
  C. PHONE
  D. CELL PHONE
  E. OTHER COMPUTING DEVICE

EXAMPLE OF SOFT ALIGNMENT

SEQ. #1: F(0.3) | Y(0.5) | O(0.5) | T(0.2) | O(0.7) | R(0.6)
SEQ: #2: F(0.8) | Y(0.6) | O(0.9) | D(0.7) |        | R(0.4)
COST:    0    +   0    +   0    +  0.45  +  0.7 +   0   = 1.15

FIG. 3

EXAMPLE OF SOFT ALIGNMENT OF A SUBSEQUENCE

SEQ. #1: F(0.3) | Y(0.5) | O(0.5) | T(0.2) | O(0.7) | R(0.6)
SEC. #2:        |        | O(0.9) | D(0.7) | O(0.6) |
COST:    0    +   0    +   0    +  0.45  +   0   +   0   = 0.45

FIG. 4

EXAMPLE OF DECISION

SEQ. #1: F(0.3) | Y(0.5) | O(0.5) | T(0.2) | O(0.7) | R(0.6)
SEC. #2: F(0.8) | Y(0.6) | O(0.9) | D(0.7) |        | R(0.4)
RESULT:  F(0.8) | Y(0.6) | O(0.9) | D(0.7) | O(0.7) | R(0.6)
SCORE:    0   +    0   +    0   +   0.5  +   0   +   0   = 0.5

FIG. 5

EXAMPLE OF DECISION WITH PARTIAL REPETITION

SEQ. #1: F(0.3) | Y(0.5) | O(0.5) | T(0.2) | O(0.7) | R(0.6)
SEC. #2:        |        | O(0.9) | D(0.7) | O(0.6) |
RESULT: F(0.3) | Y(0.5) | O(0.9) | D(0.7) | O(0.7) | R(0.6)
SCORE:    0   +   0    +  0.0   +  0.5   +   0    +   0   = 0.5

FIG. 6

NATURAL ERROR HANDLING IN SPEECH RECOGNITION

FIELD OF THE INVENTION

The present invention relates generally to speech recognition, and more particularly to methods and arrangements for attending to errors in connection therewith.

BACKGROUND OF THE INVENTION

Automatic speech recognition is used at present for a broad variety of tasks. Some such tasks include: entering text in a computer (e.g., desktop dictation), performing a transaction or access a database over the telephone or a speech-enabled communication medium (IVR's), transcribing spoken data interactions for archival and search purposes (e.g. broadcast news, lectures or meetings), and transcribing human-to-human speech interactions as a communication aid (e.g. for the hearing impaired).

Conventional speech recognition technology cannot handle those tasks without error. A larger number of recognition errors may occur, for instance, when the acoustic environment of the speaker or the communication channel is noisy, or when the speech is fast, hesitant or poorly enunciated. Transcribing some types of information is also more error prone, for example, spelling names or addresses or long strings of digits.

The efficiency and the success of speech-enabled applications does not only depend on reducing the number of errors. At least as important is how these errors are handled and how easily the user can correct them. That has a large impact on the efficiency of the system, the quality of the user experience and the general acceptance of such systems.

In view of the foregoing, a need has been recognized in connection with improving upon the shortcomings and disadvantages presented by conventional arrangements.

SUMMARY OF THE INVENTION

Broadly contemplated in accordance with at least one presently preferred embodiment of the present invention is a user interface, and associated techniques, that permit a fast and efficient way of correcting speech recognition errors, or of diminishing their impact. The user may correct mistakes in a natural way, essentially by repeating the information that was incorrectly recognized previously. Such a mechanism closely approximates what human-to-human dialogue would be in similar circumstances. Such a system fully takes advantage of all the information provided by the user, and on its own estimates the quality of the recognition in order to determine the correct sequence of words in the fewest number of steps.

In summary, one aspect of the invention provides a method of handling errors in speech recognition, the method comprising the steps of: accepting speech input from a user and recognizing the speech input; providing feedback of the recognized speech input to the user; and accepting corrective information from the user relating to the occurrence of one or more errors in the recognized speech input.

In another aspect, the present invention provides an apparatus for handling errors in speech recognition, the apparatus comprising: an input arrangement which accepts speech input from a user; the input arrangement comprising a recognizer which recognizes the speech input; a feedback arrangement which provides feedback of the recognized speech input to the user; and a correction arrangement which accepts corrective information from the user relating to the occurrence of one or more errors in the recognized speech input.

Furthermore, in an additional aspect, the present invention provides a program storage device readable by machine, tangibly embodying a program of instructions executable by the machine to perform method steps for handling errors in speech recognition, the method comprising the steps of: accepting speech input from a user and recognizing the speech input; providing feedback of the recognized speech input to the user; and accepting corrective information from the user relating to the occurrence of one or more errors in the recognized speech input.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 3 illustrates an example of soft-alignment in error handling.

FIG. 4 illustrates an example of soft-alignment of a subsequence in error handling.

FIG. 5 illustrates an example of decision in error handling.

FIG. 6 illustrates an example of decision with partial repetition in error handling.

DESCRIPTION OF THE PREFERRED EMBODIMENTS

Figure 1:
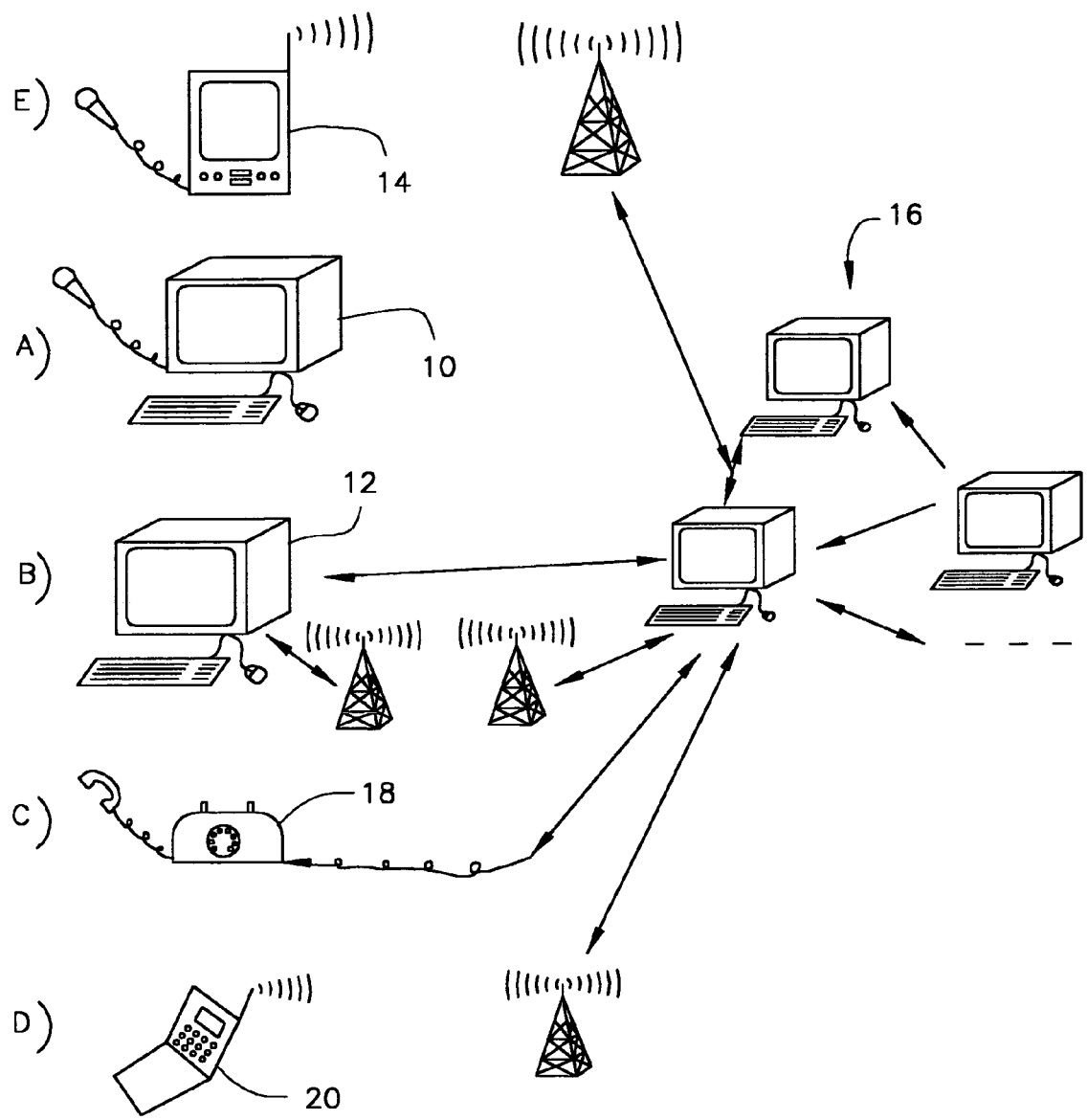
FIG. 1 depicts a variety of components that may be employed in accordance with one or more systems with which a user may interact.

Most conventional systems handle recognition errors as follows:

A. the user realizes that a recognition error occurred by examining the feedback provided by the system (through a visual display or via speech synthesis);

B. the user signals that an error occurred and optionally gives the location of the error; and C. the system prompts the user to repeat the information that was incorrectly recognized.

In accordance with at least one presently preferred embodiment of the present invention, however, a more flexible and efficient interaction between the user and the system in the event of recognition errors is permitted via:

1. merging the above-listed steps B and C, thus allowing the user to signal the presence of one or more errors, the location of the error(s), and provide a correction all in one step;

2. allowing the use of context-sensitive natural correction commands (for example by saying "there is no 'b' in my name", or "the last digit is five, not nine");

3. making the system initiate context-sensitive clarification dialogs when necessary (for example by asking "is in c as in Charles" or d as in Dorothy?");

4. using all the repetitions, or partial repetitions, of the same information given by the user to come up with the best possible answer, instead of solely the latest utterance;

5. using all the repetitions, or partial repetitions, of the same information given by the user to better accomplish the task, even when the user does not explicitly request a correction.

Item no. 4 above has been addressed in part by U.S. Pat. No. 5,712,957: "Locating and correcting erroneously recognized portions of utterances by rescoring based on two N-best lists" (Waibel, A. H. and McNair, A. E.). That patent describes several methods for discovering the location of the errors and providing a correction. One method requires the use of a mouse and a display to highlight the subsection containing one or more errors. Another technique involves generating a special language model that contains the whole substring of the first recognized utterance, allowing the user to utter again the portion that he/she wishes to correct, then validating the location of the substring detected by the system and, finally, providing a correction by speech or other means (i.e., the user provides the correction by uttering the substring that has been located in the previous step, or provides the corrected substring via some other means, e.g., a keyboard).

By their very nature, these techniques require several steps of interaction between the user and the system, even in the most favorable scenarios: (a) to signal the presence of an error, (b) to give the location of the error, and (c) to correct the error. In contrast, the techniques broadly contemplated herein minimize the number of steps needed. In the best scenario, the user can signal, locate and correct the error in one step. As a result, the user can complete his task faster and in a more natural way.

Another key benefit of the presently contemplated techniques over those of U.S. Pat. No. 5,712,957, may be found in a more powerful correction mechanism. The methods contemplated in U.S. Pat. No. 5,712,957 tend to require that the correct words be in the list of N best hypotheses returned by the recognizer. Even when the repetition of the "errorful" phrase is incorrectly recognized by the system, the techniques broadly contemplated herein may still be able to find out what the correct words are. This is achieved through the use of word confidence scores and a word-by-word merging of the multiple recognition results.

A technique broadly contemplated herein for merging several recognition hypotheses bears some resemblance to a published technique named ROVER, as disclosed in J. G. Fiscus, "A Post-Processing System to Yield Reduced Word Error Rates: Recognizer Output Voting Error Reduction (ROVER)" (*Proc. IEEE Automatic Speech Recognition and Understanding Workshop*, Santa Barbara, Calif., 347-352, 1997). ROVER combines all at once the output of different speech recognizers working on the same utterance in order to reduce the number of errors. It uses a fixed number of recognizers that process each utterance in its entirety.

Broadly contemplated in accordance with at least one embodiment of the present invention, however, is the combining of the output of one recognizer on multiple utterances, one at a time. The utterances may only be partial repetitions of the sequence of words being corrected. Each repetition may deal with a different part of the sequence of words. Unlike ROVER, the correction techniques broadly contemplated herein represent an iterative process where full use is made of each repetition as soon as it becomes available and the result conditions what the next action will be.

As a matter of distinguishing the arrangements and methods broadly contemplated herein, it should be noted that neither U.S. Pat. No. 5,712,957 nor the ROVER arrangement addresses the items 1, 2, 3 and 5 listed further above.

The disclosure now turns to a detailed discussion of embodiments of the present invention.

The description that follows applies to the spoken interaction between a "user" and a "system" (i.e., any and all machinery and/or associated components that a user may interact with). The composition of the system may vary, as well as the communication means that a user may employ to interact with a system, as shown in FIG. 1. The system may include a single computer (10), personal digital assistant (14) or other computing device. It may also include several computers connected in a network (12 and 16), where each one performs part of the tasks described below. Spoken communications between the user and the system can occur through a microphone associated with a computer 10/12 or personal digital assistant 14 and loudspeakers (not shown). It can also take place through a telephone (landline 18 or wireless 20), in which case one or more computers in the system will preferably be fitted with telephony equipment. Additional user-system interaction may also occur through a keyboard, mouse or display. The system, regardless of what is employed therein, preferably also comprises a speech recognition unit and, preferably, a speech synthesis unit (not shown in FIG. 1).

The system allows the user to perform a task through spoken commands and spoken dialogs, optionally with the help of a keyboard, mouse, display or other input/output device. The task may be to perform a transaction (e.g. place an order, transfer funds, make a phone call), to retrieve information (e.g. check account balances, check flight schedules, retrieve e-mail) from the computer system, to enter information into a database (e.g. enter a phone number, dictate a letter or e-mail), or to have one's words transcribed for others to read (e.g. meeting or lecture transcription).

During the course of interaction, the system will preferably provide the user with feedback about the output of the speech recognition unit. Feedback may be provided through speech synthesis or by displaying the results on a screen. The system may ask for confirmation explicitly or implicitly. The user may then continue with the task, or correct the previous information by repeating it or repeating the part of it that has been incorrectly recognized. Examples are shown immediately below.

DIALOG EXAMPLE NO. 1

( . . . )
System: "what amount do you want to transfer?"
User: "two hundred and fifty dollars"
System: "two hundred and sixty dollars. Do you wish to proceed?"
User: "no, it is two hundred and fifty"
System: "two hundred and fifty dollars. Do you wish to proceed?"
( . . . )

DIALOG EXAMPLE NO. 2

( . . . )
System: "please spell the name now"
User: "D O S T O E V S K Y"
System: "is D O S D O E V S K Y correct?"
User: "S T O"
System: "is D O S P O E V S K Y correct?"
User: "S, T as in Thomas, O"
System: "is D O S T O E V S K Y correct?"
( . . . )

In example 1 above, the system implicitly asks for confirmation and the user simply repeats the correct amount. In the second example, the system explicitly asks for a confirmation and the user first repeats part of the information, then chooses to repeat it again in a different way.

The user may also provide correction commands, for example:

DIALOG EXAMPLE NO. 3

( . . . )
System: "what is the reference code?"
User: "one zero X Y three two one"
System: "10XY325 cannot be found, please check the number"
User: "the last digit is one"
( . . . )

DIALOG EXAMPLE NO. 4

( . . . )
System: "Please say the card number"
User: "4321 5678 1357 4680"
System: "is 4321 9618 1357 4680 the correct number?"
User: "it is 567, not 961"
( . . . )

In example 3, the user gives the location of the error and the replacement digit. In example 4, the user repeats both the correct digits and the incorrect ones as a means to locate the error.

Finally, the system can also ask disambiguation questions (i.e., explicit clarification questions) if it estimates that it will resolve the problem in the shortest time. For example:

DIALOG EXAMPLE NO. 5

( . . . )
System: "please spell your name"
User: "F Y O D O R"
System: "is F Y O T O R correct?"
User: "O D O"
System: "is it B as in Bravo or D as in Delta?"
User: "D as in Delta"
System: "is F Y O D O R correct?"
( . . . )

In example 5, after the first repetition, the set of possibilities for the fourth letter has been has been narrowed down to either 'C' or 'D' but neither is significantly more likely than the other. Explicitly asking the user is the fastest way to resolve the issue. If neither answer were correct, the user could still provide an alternate answer.

In all the above examples, it is important to note that the repeated words do not merely replace the previous ones. The original utterance and its repetition(s) or partial repetition(s) are all utilized to come up with the best possible hypothesis. Hence, even if the repetition is not recognized correctly, it is still possible for the system to come up with the correct information. And even if the user needs to repeat or provide a correction more than once, the likelihood that the system finds the correct words increases with every repetition. The techniques needed to achieve that are detailed in the next section.

A slightly different scenario arises when the user does not explicitly try to correct recognition mistakes but still repeats some of the sentences or phrases that he spoke before. This may happen during a meeting or a lecture that is being transcribed by a speech recognition system. The system will automatically detect that a phrase has been repeated and use the techniques described below to increase the accuracy of the transcription.

Alternatively, the repetitions may be used not to correct the previous utterance, nor to improve the transcription accuracy, but to make better use of the information provided by the user. In copending and commonly assigned U.S. patent application Ser. No. 09/811,053, filed Mar. 16, 2001, of Sara H. Basson, Dimitri Kanevsky, and Benoit Maison and entitled "Hierarchical Transcription and Display of Input Speech," a speech recognition system is used as a communication aid for the hearing impaired. The display shows a mixture words, syllables, phonemes. The level of representation depends of the level of confidence assigned by the recognition unit to the recognition results. High confidence segments are displayed as words. Other segments are displayed as syllables if they meet a pre-defined confidence threshold, or as phonetically if the confidence is too low. Such a display is designed to facilitate the use of speech recognition as a hearing aid when there are recognition errors. It can be used for example by students in a classroom, or by the attendees of a meeting. In that setup, it will often happen that the speaker repeats the same information several times. The system can take advantage of the repetitions to better detect which parts should be displayed as words (because they are probably correctly recognized) and which parts should be displayed as phonemes (because they are less likely to be correct).

Figure 2:
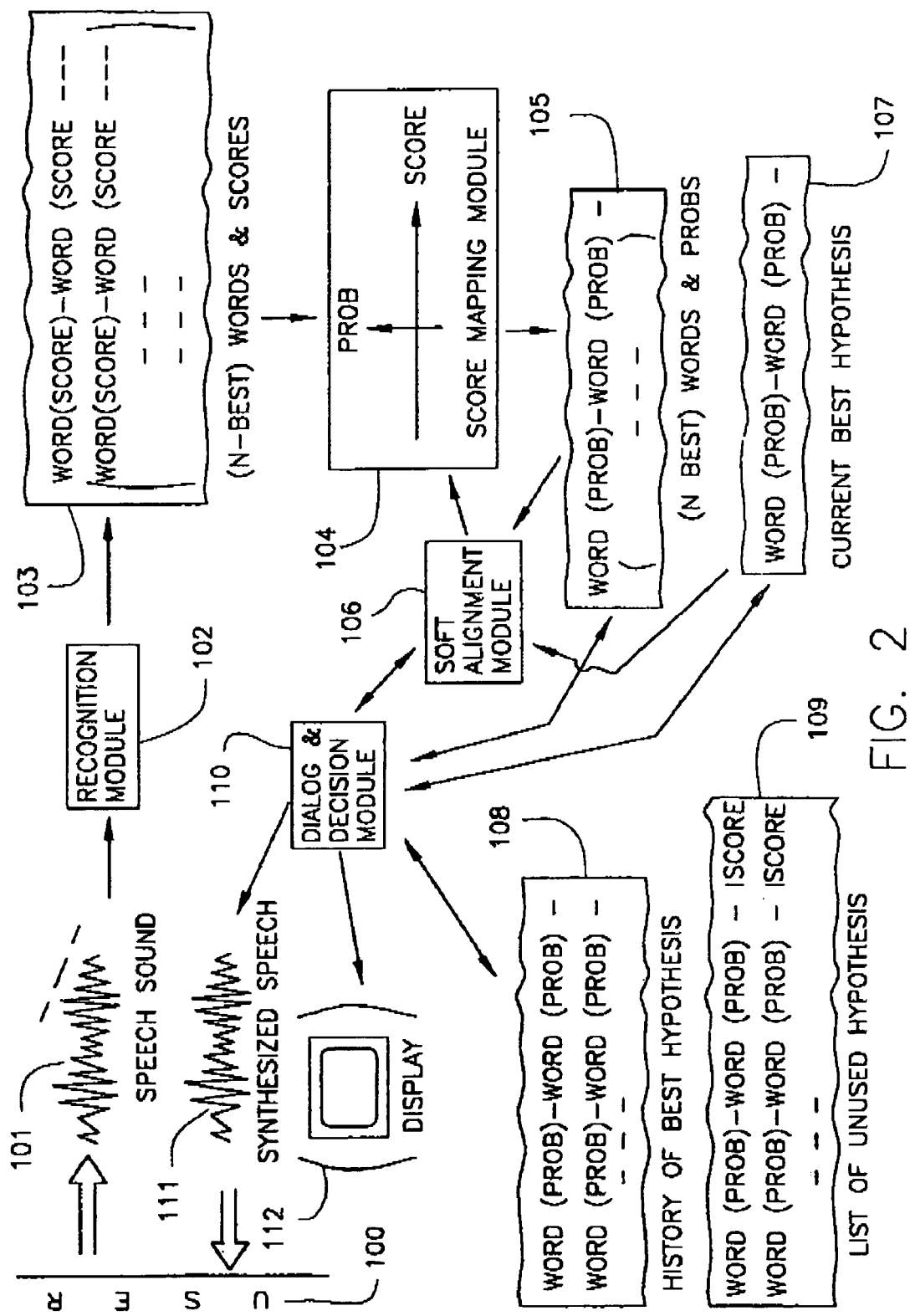
FIG. 2 is a flow diagram of an error handling process.

The general process by which a new utterance from a user (100) can be used to correct previous recognition results is illustrated in FIG. 2. The digitized sound (101) is sent to the speech recognition module (102). The speech recognition module preferably produces a list of N hypotheses (103). Each hypothesis is made up of a sequence of words. A score is associated with each word. The recognition unit assigns higher scores to words that are more likely to have been correctly recognized. All the scores are transformed by the score mapping module (104). The result is a new list of N hypotheses (105) where the score of each word, comprised between 0 and 1, is the estimated probability that the word is correct. The soft alignment module (106) takes as inputs the list of N hypotheses with word probabilities and the current best hypothesis (107), or the sequence of words with probabilities provided by the dialog and decision module (110). The results of the alignment module are given to the dialog and decision module (110). One or more new hypotheses are generated by the dialog and decision module (110). Each of them has a score. The best one is made the current best hypothesis (107), is output to the user by means of synthesized speech (111) or on a display (112), and is stored on top of the history of best hypotheses (108). The other hypotheses generated by the dialog and decision module are stored in the list of unused hypotheses (109) and sorted by decreasing score. The dialog and decision module may also generate disambiguation questions that are spoken or displayed to the user (100).

The score mapping module (104) preferably takes as input a recognition score and produces as output a number between zero and one. It can be done via a mathematical function or by looking up a table of values. The function is preferably designed to make the output value an estimate of the probability that the word is correct.

The soft alignment module (106) preferably accepts as input two sequences of words, with a probability associated which each word. It puts words from each sequence in correspondence, as much as possible by pairing up identical words. It is possible that some words may not be associated with any word of the other sequence. The correspondence must respect the ordering of both sequence: if word a1 of sequence 1 is associated with word a2 of sequence 2 and if word b1 of sequence 1 is associated with word b2 of sequence 2, then when a1 comes before b1 in sequence 1, a2 must come before b2 in sequence 2. The set of associations between the words is called an "alignment". When the two sequences are not identical, i.e., when a perfect match is not possible, the probabilities associated with the words can be used to determine a 'maximum probability' alignment. The module also preferably outputs the alignment cost, determined as shown below.

FIG. 3 shows an example of alignment, the probabilities associated with each word being shown in parentheses. The cost of each association, and the total cost are shown on the third line. Here, the cost is determined via the following: 'T' in sequence 1 does not match 'D' in sequence 2, so the associated cost is their average probability (0.2+0.7)/2=0.45; 'O' in sequence 1 has no match in sequence 2, so the cost is its own probability: 0.7.

The soft alignment module can also find the best match for a smaller sequence of words in a larger ones. In that case, the alignment cost does not include any cost for the words at the beginning and and/or at the end of the longer sequence that do not match any word in the shorter sequence.

FIG. 4 shows an example of the alignment of a shorter sequence. The first two associations and the last one do not incur any cost because they occur before the beginning and after the end of the shorter sequence respectively. (Indeed, though, the mismatch between 'T' in sequence 1 and 'D' in sequence 2 incurs a cost of [0.2+0.7]/2=0.45.)

When the new sequence is aligned with the old sequence, the sites where a mismatch occur should preferably be the sites where the confidence is lower. Using the probabilities to decide alignment will ensure that the dialog and decision module (110) will make 'repairs' in the part of the old sequence with the lowest confidence scores. Costs may be computed from the word probabilities in a different way (e.g. using geometric averages or some other mathematical formula) and still achieve the same effect.

The dialog and decision module (110) preferably maintains the history of user interaction in the form of a current 'best hypothesis', a list of 'past best hypotheses', and a list of 'unused hypotheses'. Each new user input, as transcribed by the speech recognition module, is analyzed by the dialog and decision module and the appropriate processing is done. The new best hypothesis (also called 'merged hypothesis' hereafter) is then presented to the user via speech synthesis, or displayed to him/her, and the next user reaction is awaited.

The user inputs will preferably be considered as falling into several categories:
  a) repetitions of the data;
  b) partial repetitions of the data;
  c) simple commands; and
  d) edition commands.

Categorires a) and b) are preferably handled in a similar manner. The repetition of the data to be discovered can be embedded in larger sentence like in example 1 above ("no, it is two hundred and fifty"), or worded differently, like in example 2 above ("T as in Thomas"). In all cases, the new input is preferably transformed to a normalized wording, respectively "2 5 0" and "T" in the examples 1 and 2. The word probabilities are preferably carried from the original wording to the normalized wording. If several words are transformed into one, their probabilities are averaged. The new, normalized, utterance is given to the soft alignment module along with the previous best hypothesis. An alignment between the two word sequences is returned.

The new best hypothesis is preferably constructed as follows. The alignment can be considered as a sequence of 'bins'. Each bin can contain two words (one from each sequence), or only one word from the new sequence, or only one word from the previous best hypothesis. For each 'bin' a separate decision is made: either to keep the word from the new sequence or the word from the previous best hypothesis, or no word at all. The probabilities associated with the words are used to make the selection. For the bins that contain two words, the one with the highest probability is selected. A decision score is computed as is the difference between the probability of the selected word and the probability of the discarded word. For bins that contain only one word, its probability is compared to the average probabilities of the words from the other sequence found in the nearest surrounding bins. If the probability of the word is higher than the average computed from the other sequence, the word is kept. Otherwise that bin does not contribute any word to the new merged sequence. The difference between the winning probability (or average) and losing probability (or average) is the decision score. An important exception to this procedure deals with partial repetitions of the data. In that case, a number of bins at the beginning of the sequence and/or at the end of the sequence only contains words from the previous best hypothesis. Any uninterrupted sequence of bins starting with the first bin, or ending with the last bin, that only contains words from the previous best hypothesis, is given the following special treatment: those bins always output the word from the previous best hypothesis regardless of its probability. Their decision score is zero. Finally the output from all bins is collected in the sequence order to construct a merged hypothesis, (or new candidate best hypothesis). The total decision score is the total of the decisions scores of all bins.

FIG. 5 shows a decision example. In the fourth bin, T is replaced by D with a score of 0.5. In the fifth bin, O from the first sequence is kept because its score (0.7) is higher than the average of the scores of D and R in the second sequence ((0.7+0.4)/2=0.55). The probabilities output by bins 1, 2, 3 and 6 (where the words match) is the largest from either sequence.

FIG. 6 shows an example of decision when the data has been partially repeated. The first two words from the first sequence (F and Y) are copied unchanged to the new hypothesis because they occur before the start of the second sequence. The last word (R) is likewise copied to the new hypothesis.

Before it can be considered the new best hypothesis, it is preferable to first check that it does not already appear in the list of hypotheses already presented to the user. If it does not appear in the list, it is added to it and presented to the user as the new latest best guess for confirmation or further correction.

If it already appears in the list another hypothesis is generated until one is found that as not been presented to the user before. This is done as follows.

If the speech recognition module returned more than 1 (i.e. N>1) hypothesis, then the processing described above (soft alignment, then bin-by-bin decision) is preferably repeated for all N hypotheses. The first one that is found will be the new best hypothesis. The remaining one or ones are added to the list of 'unused hypotheses'.

Even if the new best hypothesis generated from the top recognition hypothesis does not already appear in the list of hypotheses already presented to the user, if the speech recognition module returned more than 1 (i.e. N>1) hypothesis they are all processed as described above and the unused N−1 merged hypotheses are added to the list of 'unused hypotheses'.

When all recognition hypotheses fail to produced a merged hypothesis never presented before, the list of 'unused hypotheses' is searched by order of decreasing scores, until one that has not been presented before is found. The scores used to rank the hypotheses is the average word probability.

If all the above procedure fails, the list of N hypotheses output by the speech recognition engine is processed again. For each bin, both the decision that was taken originally (i.e. keeping the word with highest probability) and the reverse decision are now considered. The reverse decisions are given a negative decisions score. Then a series of merged hypotheses with decision scores that are lower than the original decision score (and possibly negative) are generated, in decreasing score order. This is done by first reversing only one decision in the bin that yielded the smallest decision score, then by reversing one decision in the bin with the next smallest scores, etc. A series of hypotheses that all have a lower score than the original decision is generated. The more bin decisions that are reversed, the lower the score of the new hypothesis. Many combinations of decision reversals can be generated that way (exactly 2 to the power N, minus one, where N is the number of mismatch bins where a decision had to be taken in the first place). The new hypotheses that have the smallest score decrease with respect to the original are considered first.

Any uninterrupted sequence of bins starting with the first bin, or ending with the last bin, that only contains words from the previous best hypothesis is left unchanged, and is given the same special treatment as before. The reverse decisions are not considered for those bins; they always output the word from the previous best hypothesis. This procedure is repeated until a merged hypothesis that has not been presented to the user before is found.

Optionally, a new hypothesis can also be generated by replacing the words with the lowest scores by words that are often mistaken for them by the recognizer because they sound similar; for example, the words 'nine' and 'five' or the letters 'b' 'd' 't' and 'p'. Groups of "confusable" words can be stored in a database. The words of the current best hypothesis, starting with the words with lowest scores, can be compared to the database and replaced by other words in their group, until a new hypothesis is found.

In the unlikely event that no new hypothesis can be found by any of the procedures described above, the user is preferably asked to repeat.

Optionally, the system can ask a disambiguation question to the user instead of presenting the latest best hypothesis, if several conditions are met. This is preferably done as follows. The score of the new best hypothesis (denoted by s[0]) is compared to the scores of the list of 'unused hypotheses' (denoted by s[i], i=1 ... M), if there are any. The C unused hypotheses that have a score s[i]>s[0]−D, where D is a pre-set constant, are marked. If only a small number of them (C=1 or C=2) meet the criterion, each of them is aligned with the best hypothesis using the soft alignment module. If all of them differ from the best sequence in only a few distinct positions, then a disambiguation question will be asked to the user. The question will present a choice between the C+1 subsequences extracted from the unused sequences and from the best sequence at the positions where any of them differs from the best sequence (so that all subsequences have the same length). For example, the system might ask the question: "are the first two letters 'c e' or 'd b' ? ". The system will attempt to interpret the next input from the user either as a direct answer to the question (e.g. "the first one", "neither", etc.), or as a repetition of that particular subsequence ("yes, 'c e'"), or as a repetition of the whole sequence, and process it accordingly.

Examples from above-listed category c) of simple commands are: "it is correct", "the previous one was better", "start over", "transfer to operator", etc., in various wordings. The first one ('correct') signals that the correction system has finished its task and that control should be transferred to the general application logic.

The next example will result in the previous best hypothesis being retrieved from the list and presented again to the user. The third one will result in all lists of hypotheses being cleared and the original recognition result being presented to the user. Commands that are beyond the scope of the correction system are preferably passed on to the general dialog management system of the application.

Examples from above-listed category c) of edition commands are: "the is only one t", "the last digits are '58'", "it is 576, not 961", "delete the first word", etc.

Commands that do not include any data entry, like example 4 above ("delete the first word") are simply executed, the newly generated word sequence is added to the list of best hypotheses and is presented to the user. For other commands, the soft alignment module and the decision procedure described hereinabove will preferably be used in various combinations.

For example, the user utterance "the last digits are '58'" may be processed as follows.

The alignment module will not be used, since the alignment can be inferred from the command. The items '5' and '8' will be associated with the last two items of the previous hypotheses. Then the usual decision procedure will be applied.

For the utterance "it is 576, not 961", the alignemnt module will be used to find the best match for the sequence '5 7 6' in the the previous sequence, but '9 6 1' will be used instead of '5 7 6' for the merging step.

Many other types of commands uttered by the user can be processed in a similar way. Examples of such commands could be, e.g., "remove the last letter", "there is no 'd'," "the previous one was better", "start over", etc. ...

The correction system described above may also be used in applications where the user does not explicitly provide corrections when recognition errors occurs, as mentioned in section heretofore. In this case, where automatic correction may be involved, the user's speech is processed continuously, and the speech recognition outputs its transcription in variable-length phrases. The phrase boundaries could correspond to pauses in the speech but need not be. As each phrase becomes available, the soft alignment module is preferably used to match it to the transcribed text that was output before, going back a pre-set time interval in the past, or a pre-set number of words. If the alignment module finds one or more matches with a low alignment cost (according to a pre-set threshold), then the new sequence and the sequence detected in the previous text are preferably merged according to the procedure described hereinabove, and the merged sequence is used to 'repair' both the previous sequence and the new phrase. Smaller segments extracted from the new phrase are also matched to the previous text, to account for the fact that the boundaries of repeated sequence of words may be different from the phrase boundaries imposed by the recognizer.

Another possible refinement of the present invention will now be described. As mentioned above, in U.S. patent application Ser. No. 09/811,053, a speech recognition system is used as a communication aid for the hearing impaired. The display shows a mixture of words, syllables, and phonemes. The level of representation depends of the level of confidence assigned by the recognition unit to the recognized words. Such a display is designed to facilitate the use of speech recognition as a hearing aid when there are recognition errors. It will often happen that the speaker repeats the same information several times. The repetitions can be used to automatically correct the decoded words, as described hereinabove, but also to better select which words to display as words and which ones to display as a sequence of syllables and/or as a sequence of phones.

A procedure similar to that described hereinabove is used. Each newly recognized phrase is matched to previously decoded text. Smaller pieces of the new phrase are also matched. Whenever a match is found (according to a pre-set threshold), however, only the confidence scores are updated, for all the words that match exactly. More precisely, for all the bins that contain two identical words, the word with lower confidence is given the (higher) confidence of the other word. This procedure does not change the decoded words, only the confidence score that are associated with some of them. After that, the procedure described in U.S. patent application Ser. No. 09/811,053 is applied anew on the words that have an increased confidence. Some of those that were previously displayed as sequences of syllables or sequences of phones (or any other visual indication of the confidence level such as color, font size, etc.) will be switched to a higher level of representation (e.g., word instead of syllables, darker color, etc.). Progressively, as more speech is being transcribed, and if it contains repetitions, the mixed display will adapt and better reflect the true (but unknown) status of the words (correct or incorrect).

It is to be understood that the present invention, in accordance with at least one presently preferred embodiment, includes an input arrangement which accepts speech input from a user, the input arrangement comprising a recognizer which recognizes the speech input, a feedback arrangement which provides feedback of the recognized speech input to the user, and a correction arrangement which accepts corrective information from the user relating to the occurrence of one or more errors in the recognized speech input. Together, these components may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of handling errors in speech recognition, said method comprising the steps of:

accepting speech input from a user and recognizing the speech input;

providing feedback of the recognized speech input to the user; and accepting corrective information from the user relating to the occurrence of one or more errors in the recognized speech input, wherein said step of accepting corrective information comprises permitting the user to simultaneously signal with only one input the presence of one or more errors and to perform both of: indicating at least one location of the one or more errors, and providing at least one correction to the one or more errors, without the user separately signaling the presence of one or more errors.

2. The method according to claim 1, wherein said step of accepting corrective information comprises permitting the use of context-sensitive natural correction commands.

3. The method according to claim 1, wherein said step of providing feedback to the user comprises providing a context-sensitive clarification dialog, said clarification dialog comprising explicit or implicit confirmation requests.

4. The method according to claim 3, wherein said explicit confirmation request is a disambiguation question.

5. The method according to claim 1, wherein said step of accepting corrective information comprises:

accepting from the user a plurality of repetitions of corrective information; and using at least a portion of the repetitions of corrective information to arrive at a best hypothesis of corrective information.

6. The method according to claim 1, wherein said recognizing step comprises:

producing a list of hypotheses related to the speech input, each hypothesis comprising a sequence of at least one word; and scoring each word, with higher scores being associated with words that have been more likely to have been correctly recognized.

7. The method according to claim 6, further comprising the step of transforming the score of each word to form a new list of hypotheses, whereby the transformed score of represents the estimated probability that the corresponding word is correct.

8. The method according to claim 7, further comprising the step of comparing words from the new list of hypotheses with a current best hypothesis and determining a new best hypothesis for each word.

9. The method according to claim 8, wherein said comparing step comprises comparing like words when possible.

10. The method according to claim 9, further comprising the steps of:

providing additional feedback of recognized speech input subsequent to said step of accepting corrective information and associating at least one confidence score with such speech input;

said step of providing additional feedback comprising the representation of recognized speech input having lower confidence scores in a first manner and the representation of recognized speech input having higher confidence scores in a second manner, the first manner involving a lower level of representation than the second manner.

* * * * *